April 13, 1948. L. C. BLACKLEDGE 2,439,557
ROTARY PLOW
Filed July 29, 1943 2 Sheets-Sheet 1
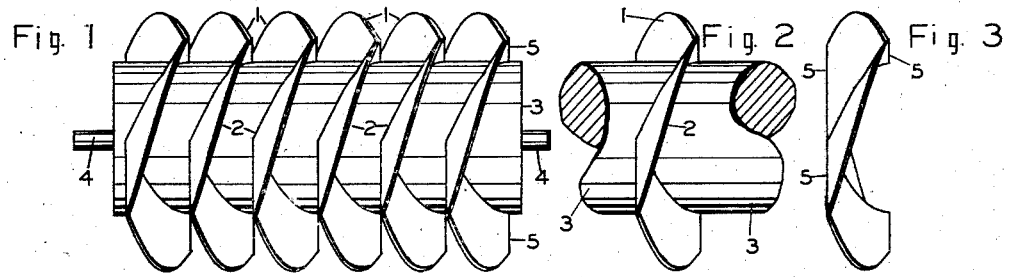
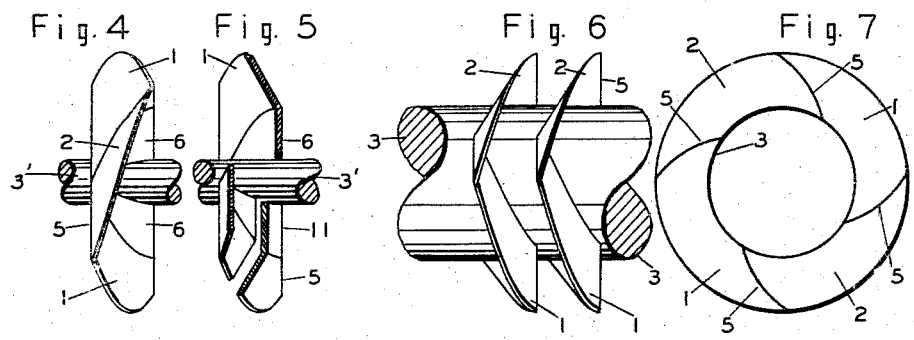
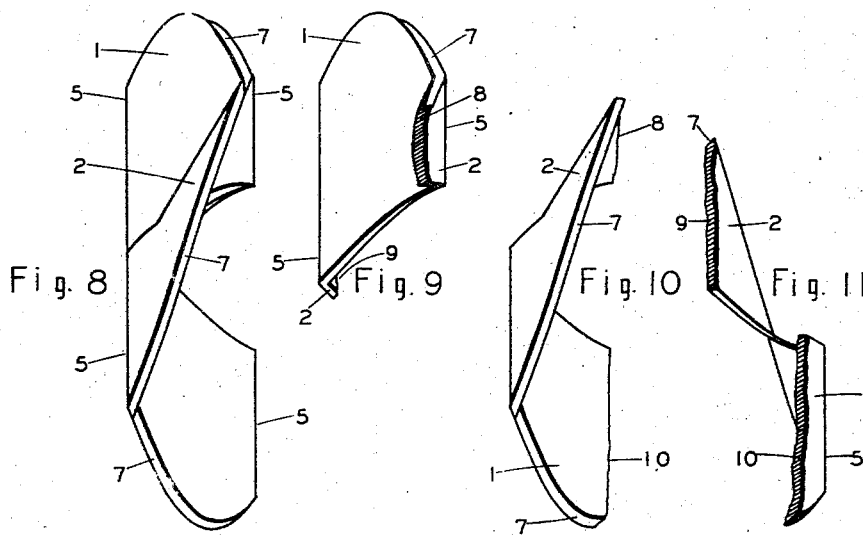
INVENTOR
Lawrence C. Blackledge
BY
ATTORNEY

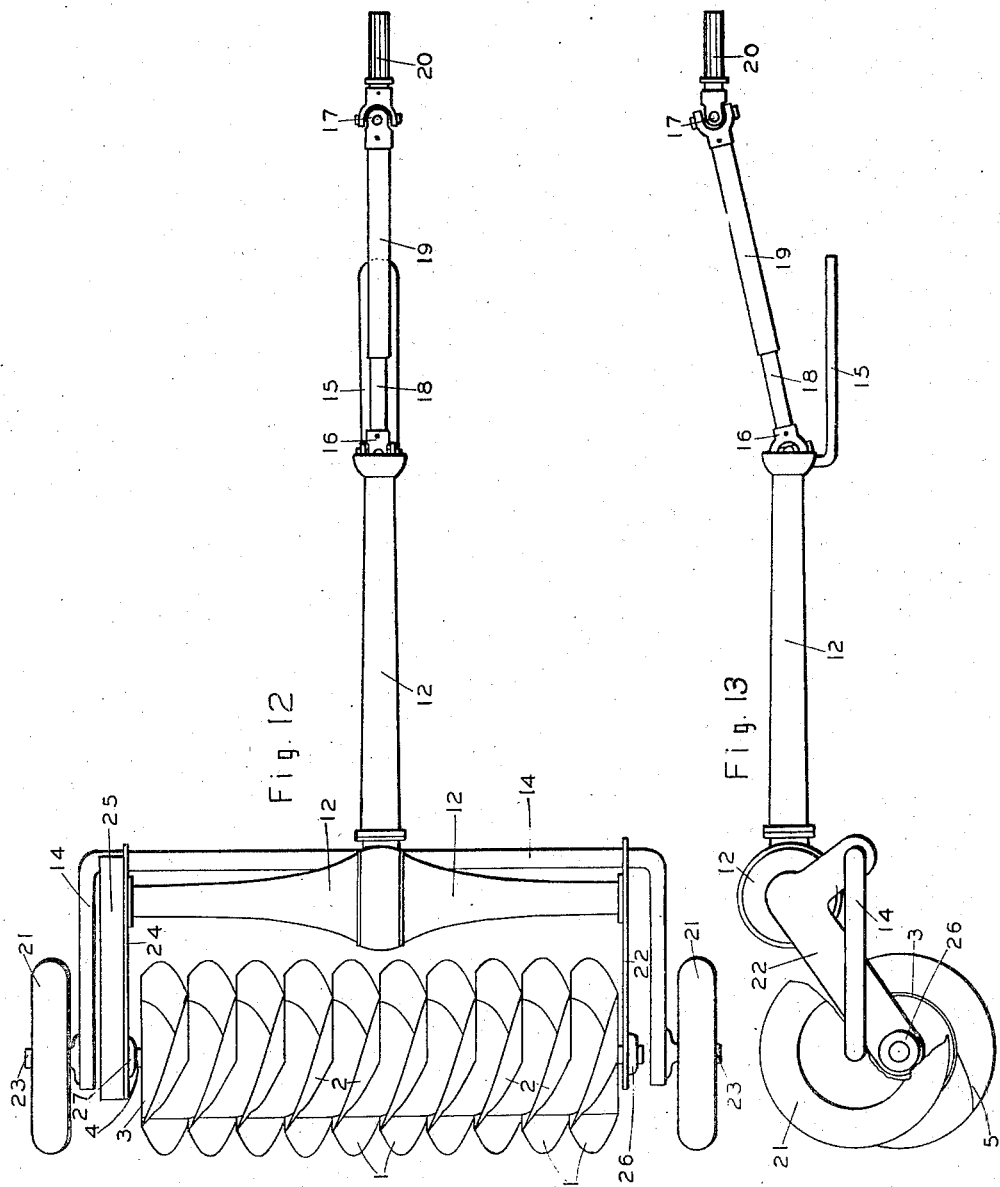

Patented Apr. 13, 1948

2,439,557

UNITED STATES PATENT OFFICE 2,439,557

ROTARY PLOW

Lawrence C. Blackledge, Portland, Oreg.

Application July 29, 1943, Serial No. 496,580

10 Claims. (Cl. 97—219)

The principal object of my invention is to provide a novel type of rotary plow, and an earth-working element therefor, which functions to cut loose the surface of the soil and displace it laterally without effectively displacing said plow laterally. This is accomplished by making said earth-working element of a series of closely spaced blades, each blade having a plurality of alternately inclined faces. Thus when said element is rapidly rotated, it tends to shift the earth cut loose laterally in successive operations, first towards one side, then towards the other. Because of the rapidity at which said blades rotate, said opposite displacements of earth tend effectively to counteract each other and the plow tends to move forward without lateral displacement.

A further object of my invention is to provide devices of this character which effectively tend to cut loose and break up the surface of ground being worked and to distribute said cut and broken portions uniformly to define a plane surface rearwardly of said plow.

A further and more specific object of my invention is to provide a rotary plow of the helicoidal type, with blades defining sections or folia which are alternately dextrorsal and sinistrorsal. Said blades thus end to displace earth being worked equally and oppositely to produce the results set out above.

This application is a continuation in part of my copending application for patent entitled Rotary plows, filed September 1, 1942, Serial No. 456,853, now abandoned.

Further and other details of my invention are hereinafter described with reference to the accompanying drawings, in which:

Fig. 1 is an elevation of a cutting element comprising a plurality of blades, fixed to an elongated rotary member;

Fig. 2 is a similar but broken elevation of said elongated member with a single blade mounted upon the periphery thereof;

Fig. 3 is an elevation of a single blade embodying my invention removed from said elongated member;

Fig. 4 is an elevation of a modified type of blade embodying my invention;

Fig. 5 is a cross-sectional view taken diametrically through the modification shown in Figure 4 to disclose structural details thereof;

Fig. 6 is an elevation of a cutting element showing two blades mounted upon a central elongated member shown broken away, said figure showing the same structure disclosed in Figs. 1 to 3, inclusive, but shown rotated approximately 45°;

Fig. 7 is a view looking at the face of one of said cutting blades as arranged in Fig. 6;

Fig. 8 is an elevation taken on a slightly larger scale illustrating a still further modification of my invention, but being generally of the type shown in Figs. 1 to 3, inclusive;

Figs. 9, 10 and 11 are fragmentary broken views of the modification shown in Fig. 8 illustrating the structural features of said modified blade, said figures illustrate together the structure of said blade as it would appear if it were broken along the edges shown in the section, said figures showing together a single blade element;

Fig. 12 is a plan view of a rotary plow including a cutter blade embodying my invention, said cutter blade being shown somewhat schematically; and Fig. 13 is an elevation of such plow with portions of one load carrying wheel shown broken away.

A cutter element embodying my invention is illustrated in Figs. 1 to 3, inclusive. Said cutter element comprises a series of spaced blades comprising cutting sections 1 and 2 mounted upon and spaced longitudinally of an elongated journalled member 3. In the figures said cutting blades define helicoids comprising dextrorsal and sinistrorsal helicoidal shapes, the dextrorsal sections are numbered 1 and the sinistrorsal sections are numbered 2. Said blades are secured about the periphery of member 3 by welding, press fitting or other type of appropriate securing means. Said blades are spaced uniform distances apart, and extend from one end of the elongated member to the other. Said elongated member preferably is carried by an axle 4, so that it is concentrically journalled.

The line or ridge formed by the said dextrorsal and sinistrorsal sections is given number 5 in the views. It is to be noted that said ridges define the ultimate width of each of said blades. Said blades are arranged upon member 3 so that said ridges on one blade aline with the proximate ridge on the adjacent blade. That is, the blades are set on spacings substantially equal to the lateral inclination or the pitch of said elements 1 and 2 and thus said blades cover the entire length of said member 3 to define a more or less continuous cutting action. I deem this important because this eliminates ridges between blades when the cutter element is used in working ground. It is to be noted also that the similar elements in adjacent blades are in longitudinal alinement; that is they nest one in the other.

The member 3 preferably is tubular and the ends are capped to accommodate the axle 4 so that a secure mounting is attained.

In Figs. 4 and 5 I illustrate how a cutting blade may be formed with the peripheral portions forming oblique helicoids of opposite hand and the central portion 6 defines a right helicoid. The provision of said right helicoidal portion provides a mold board effect. That is, the oblique helicoidal portions of each blade which extend to the periphery of the elongated member 3 sometimes tend to permit dirt to accumulate. Each blade is formed as an annulus and if the central portions constitute right helicoids and the marginal portions oblique helicoids then this difficulty of holding dirt is minimized or eliminated even when a cutter is operating in sticky ground, sometimes referred to as gumbo. I have given the same reference numerals to the similar parts in Figs. 4 and 5 as I have to similar parts in Fig. 3. The lines of demarcation or ridges between the portions of the right helicoid are designated as 11, and they aline with ridges 5, as is indicated in Fig. 5.

I deem it preferable that the central portions of each of the blades be formed as a helix so that lateral stability is attained. That is, if the points of joinder between blades and cylinder are formed upon a curve extending spirally about the cylinder, then said blades do not tend to flex or shift longitudinally of the elongated member.

When blades of relatively small external diameter are mounted on an elongated member, they may be made of a relatively thin section and it is not essential that their outer edges carry a beveled, sharpened edge. If said blades are of greater diameter and thickness, I deem it essential that said outer edges terminate in a sharpened beveled edge 7, as is indicated in Figs. 8 to 11, inclusive. I identify the broken edges in the Figs. 9 and 10, shown as pulled apart, by the reference numeral 8. The edges between the uppermost portion of the blade shown in Fig. 11 and the lowermost portion of the blade shown in Fig. 9, are identified by the numeral 9. The portions shown pulled apart or broken in the lowermost portions of the blade shown in Figs. 10 and 11, are identified by the reference numeral 10.

A rotary plow involving my invention comprises a frame and drive housing 12 as it would appear if an automobile or truck-type differential, axle, and torque tube were used. A tongue 15 serves to attach the rotary plow to the draw bar of a tractor (not shown). Power is supplied from said tractor to the operating portions of the rotary plow through universal joints, 16 and 17 and telescopic shaft elements 18 and 19. Said universal joints permit angular adjustment between the tractor and the plow and the telescopic shaft elements 18 and 19 accommodate slight differences in spacing. A splined shaft 20 is adapted to connect with the power take-off of said tractor, in the usual manner.

Said rotary plow is supported by two wheels 21 at the sides thereof, which wheels are supported by a U-shaped bracket 14. Bracket plates 22 and 24 secured to the drive housing of frame 12 extend rearwardly and obliquely downwardly and at the ends thereof support the cutter element comprising blades, elongated member, and axle previously described.

The wheels 21 are journalled on laterally extended spindles or trunnions 23. Said cutter is driven by a chain engaging the shaft in the drive housing and a sprocket secured to one axle. This is more or less standard construction and it thus is not specifically shown, it being understood that the chain is housed within covering 25. The axles are journalled in bosses 26 and 27 carried at the ends, respectively, of bracket plates 22 and 24.

It may thus be seen that the weight of the rotary plow is supported by wheels 21 carried by the ends of bracket 14, which is carried by the housing 12. Vertical adjustment of the rotary plow may be made by adjusting brackets 22 and 24. Said bracket plates 22 and 24 are bell cranks, as is shown in Fig. 13. Thus the effective depth of operation of said cutter may be adjusted by changing the angular position of bracket 14 with respect to said bracket plates. This may be done manually or automatically in accordance with common practice.

I claim:

1. An integral blade for a cutter element of a rotary plow comprising a relatively thin annular disc characterized by alternately disposed and laterally and oppositely inclined cutting peripheral sections and a central portion forming a right helicoid.

2. A cutter element for a rotary plow comprising an elongated driven member, and a series of spaced blades mounted thereon, each blade being characterized by a plurality of alternately arranged laterally and oppositely inclined cutting sections, said blades being spaced apart a distance equal to the lateral inclination of said blades.

3. A cutter element for a rotary plow comprising an elongated driven member, and a series of spaced blades mounted thereon, each blade being characterized by a plurality of alternately arranged dextrorsal and sinistrorsal helicoidal cutting sections, said blades being spaced apart a distance equal to one-half of the pitch distance of the helicoidal formation of said blades.

4. A cutter element for a rotary plow comprising an elongated driven member, and a series of spaced blades mounted thereon, each blade being characterized by a plurality of alternately arranged dextrorsal and sinistrorsal oblique helicoidal cutting sections, said blades being substantially uniform and arranged so that the changes in direction of pitch therein match those in adjacent blades.

5. In a rotary plow, a power driven rotary cutter comprising a plurality of annular blades mounted on an elongated journalled member, each blade comprising a thin integral section extending from the journalled member to the periphery of said blade, and having alternate continuous peripheral cutting portions defining oblique dextrorsal and sinistrorsal helicoidal sections.

6. In a rotary plow a power driven rotary cutter comprising a plurality of annular blades mounted on an elongated journalled member, each blade comprising a thin annular disk extending from the journalled member to the periphery of said blade and having an unbroken cutting edge comprising oblique helicoidal sections which changes direction alternately from dextrorsal to sinistrorsal.

7. In a rotary plow a power driven rotary cutter for pulverizing the soil, comprising a plurality of annular blades mounted on an elongated journalled member, each blade comprising a thin annular disk extending from the journalled member to the periphery of said blade, the center portion defining a right helicoid and the peripheral portion defining dextrorsal and sinistrorsal helicoid shaped sections, the perimeter of said blade constituting a cutting edge for penetrating the soil.

8. In a rotary plow a power driven rotary cutter consisting of an elongated journalled member, a series of blades mounted thereon, each blade having alternate oblique dextrorsal and sinistrorsal peripheral cutting sections, said blades being equally spaced upon the journalled member, and the oblique dextrorsal and sinistrorsal peripheral cutting sections of adjacent blades being in lateral alinement.

9. In a rotary plow, a power driven rotary cutter consisting of an elongated member on which is attached a series of blades, each blade comprising a thin integral disk extending from the journalled member to the periphery of said blade, the middle portion of said blade being a right helicoid and the peripheral portion defining continuous dextrorsal and sinistrorsal helicoidal cutting sections.

10. A blade for a cutter element of a rotary plow comprising a thin integral annulus having alternate continuous peripheral cutting sections defining dextrorsal and sinistrorsal helicoids.

LAWRENCE C. BLACKLEDGE.

REFERENCES CITED

The following references are of record in the file of this patent:

UNITED STATES PATENTS

| Number | Name | Date |
|---|---|---|
| 395,638 | Stuart | Jan. 1, 1889 |
| 503,006 | Sexson | Aug. 8, 1893 |
| 1,797,824 | Dirschauer | Mar. 24, 1931 |
| 1,878,142 | Hjermistadl | Sept. 20, 1932 |
| 2,342,030 | Bagan | Feb. 15, 1944 |